United States Patent
Rogers et al.

(10) Patent No.: US 6,972,696 B2
(45) Date of Patent: Dec. 6, 2005

(54) AIRCRAFT FUTURE POSITION AND FLIGHT PATH INDICATOR SYMBOLOGY

(76) Inventors: Steven P. Rogers, 1522 La Vista del Oceano, Santa Barbara, CA (US) 93109; Charles N. Asbury, 1616 Esplanade, Suite 12, Redondo Beach, CA (US) 90277

( * ) Notice: Subject to any disclaimer, the term of this patent is extended or adjusted under 35 U.S.C. 154(b) by 74 days.

(21) Appl. No.: 10/394,934

(22) Filed: Mar. 22, 2003

(65) Prior Publication Data

US 2005/0206533 A1   Sep. 22, 2005

(51) Int. Cl.$^7$ ............................................. G01C 21/00
(52) U.S. Cl. ...................... 340/971; 340/973; 340/980; 340/972
(58) Field of Search ........................ 340/980, 960–978; 701/3, 14, 15, 16

(56) References Cited

U.S. PATENT DOCUMENTS

| | | | |
|---|---|---|---|
| 5,357,263 A * | 10/1994 | Fischer et al. | .................. 345/9 |
| 5,420,582 A * | 5/1995 | Kubbat et al. | .............. 340/974 |
| 5,798,713 A * | 8/1998 | Viebahn et al. | .............. 340/974 |
| 6,054,937 A * | 4/2000 | Von Viebahn et al. | ...... 340/961 |
| 6,496,760 B1 * | 12/2002 | Michaelson et al. | ........... 701/3 |
| 6,686,850 B2 * | 2/2004 | Hausmann | ................... 340/967 |

* cited by examiner

*Primary Examiner*—Daniel Wu
*Assistant Examiner*—Son Tang
(74) *Attorney, Agent, or Firm*—Donald W. Meeker

(57) ABSTRACT

A programmable symbology is provided that defines a series of geometric forms in the visual field of a pilot. The symbology includes a virtual representation of a predicted flight path of the aircraft and a virtual representation of a projected contact point with an external object, including the ground. The symbology also provides a virtual representation of a predicted flight path of the aircraft that is projected onto the ground below the projected flight path as a ground path predictor. The symbology further provides a critical slowing air speed indicator.

18 Claims, 4 Drawing Sheets

AIRCRAFT FUTURE POSITION AND FLIGHT PATH INDICATOR SYMBOLOGY

BACKGROUND OF THE INVENTION

1. Field of the Invention

The present invention relates to visual displays for pilots of aircraft and in particular to a programmable symbology for defining a series of geometric forms in the visual field of the pilot providing a virtual representation of a predicted flight path of the aircraft and a virtual representation of a projected contact point with an external object, including the ground, and a virtual representation of the predicted flight path of the aircraft projected onto the ground below the projected flight path as a ground path predictor.

2. Description of the Prior Art

Aircraft, including helicopters, are highly complex systems comprised of a large number of complex, integrated subsystems that requires frequent monitoring for safe aircraft operation. Each of these subsystems generates a significant amount of status data. Additional flight complications such as nap-of-the-earth (NOE), adverse weather, and/or night flying add to the importance of aircraft status data, and also increases the amount of monitoring required. These types of flight operations require the pilot to maintain a continual spatial awareness of aircraft orientation and/or location with respect to the external world in addition to continual monitoring of the status of aircraft subsystems.

The task of monitoring the status of the various aircraft subsystems may conflict with the tasks of maintaining continual spatial and situational awareness of the external world. To monitor the status of aircraft subsystems, the pilot may have to divert his attention from the observation of the external world outside the cockpit to reference generated status data. Such diversions may lead to losses, in varying degrees, of spatial and/or situational awareness of the external world, which, in turn, may lead to less than optimal flight control, especially during high pilot workload flight operations.

Prior art attempts to deal with the problem have not been completely satisfactory, especially with regard to flight path indicators and future position indicators relative to objects in the environment.

U.S. Pat. No. 6,052,069, issued Apr. 18, 2000 to Silder, Jr. et al., provides a taxi and slope landing symbology for a helicopter having a main rotor drive shaft and a main rotor hub defining a hub moment, wherein the main rotor drive shaft and the main rotor hub have hub moment limits. The taxi and slope landing symbology comprises a first symbol for providing a symbolic representation of the hub moment limits, and a second symbol for providing a dynamic symbolic representation of the hub moment, wherein the second symbol is disposed in combination with the first symbol to provide a visual cue of the hub moment relative to the hub moment limits.

U.S. Pat. No. 5,072,218, issued Dec. 10, 1991 to Spero et al., shows images provided to a pilot in an aircraft overflying the earth by means of a helmet mounted display system. The position and attitude of the aircraft with respect to the earth and the attitude of the helmet with respect to the aircraft are monitored in order to convert a plurality of stored earth position signals into helmet coordinates. Earth points that are viewable by the pilot are displayed using symbolic images thereof such that the symbolic images coincide, from the pilot's point of view, with the actual positions of the viewable points on the earth.

U.S. Pat. No. 4,368,517, issued Jan. 11, 1983 to Peter Lovering, describes a landing display system for indicating to the pilot of an aircraft the relationship between his aircraft and a landing runway includes an aircraft symbol providing attitude information with respect to a reference horizon, a velocity vector indicative of the projected flight path of the aircraft, a descent profile vector indicative of the projected descent path of the aircraft, and a runway symbol in perspective to the aircraft. By reference to these displays the pilot can ascertain not only the present position of his aircraft with respect to the runway, but also the consequences of various corrective maneuvers accomplished with the aircraft.

U.S. Pat. No. 6,272,404, issued Aug. 7, 2001 to Amano, et al., discloses a flight path display apparatus provided in a cockpit of an aircraft having a head-up display unit. An image combining panel of the head-up display unit displays a flight path image projected from projecting system that is superimposed on the outside view. Computing system for calculating the image to be projected to the image combining panel calculates a display position of the target flight path based on data from storage system in which predetermined flight paths are stored and from aircraft flight data measuring system for measuring the position and attitude of the aircraft. When the display position of the target flight path is outside a display area of the image combining panel, a target mark indicative of a direction toward the flight path from the center of the display area blinks on the image combining panel. With the above construction, a flight path display apparatus which allows a pilot to keep sight on a target flight path is realized.

U.S. Pat. No. 5,675,328, issued Oct. 7, 1997 to Coirier, et al., indicates an optoelectronic device designed to facilitate the piloting of an aircraft under conditions of poor visibility, at take-off and in the event of an interruption of approach procedures through a wave-off maneuver. It consists of a collimator displaying, in addition to the artificial skyline, the aircraft model and the ground speed vector, two take-off and wave-off slope scales inclined symmetrically along the arms of an X laid on the artificial skyline and intersecting at a value of pitch attitude called a safety pitch attitude to be maintained in the event of engine failure, a local horizon locked into the aircraft model and two pointers that identify the safety pitch attitude and frame the artificial skyline when the pitch attitude of the aircraft corresponds to the safety pitch attitude. Through these new graphic symbols, the pilot can examine the pitch attitude of the aircraft and its roll attitude without taking his eyes off the aircraft model. This makes it easier for him to pilot the aircraft at take-off and during wave-off maneuvers with or without engine failure.

U.S. Pat. No. 5,486,821, issued Jan. 23, 1996 to Stevens, et al., concerns an artificial horizon altitude warning system for helping to prevent a controlled flight of an aircraft into the ground. The artificial horizon altitude warning system comprises an altimeter for gathering altitude information about the aircraft and generating an altitude signal; a laser assembly for producing a light in a cockpit of the aircraft; and a controller for receiving the altitude signal and for positioning the light in the cockpit to form an artificial line based on the altitude signal, the artificial line being positioned so as to be disposed along tin arcuate length corresponding to the location of an actual horizon as viewed by a pilot of the aircraft.

What is needed is a visual field symbology for indicating flight path including future position relative to the ground and potential points of contact with external objects in a way that is compatible with the viewed external environment.

SUMMARY OF THE INVENTION

An object of the present invention is to provide an improved, Flight Path Predictor (FPP) symbology for a display, presenting the predicted three-dimensional positions of the aircraft in space over various periods of time in the future which would be useful for visualizing the future path of the aircraft through the air and over the ground to aid in a broad variety of flight and mission tasks.

Another object of the present invention is to provide a symbology for display in the pilot's visual field that provides the most appropriate methods of displaying the results of flight path predictor technology to aid the pilot's perceptual, cognitive, and motor tasks while operating the aircraft.

One more object of the present invention is to provide a symbology for visual real time flight path indication using circles which can be seen through the aircraft panels and which circles block much less display space than other symbols, and their oval shape when seen at an angle provided a better aspect cue than other symbols.

An additional object of the present invention is to provide a flight path predictor symbology using spaced apart circles so that if the circles are all concentric, the aircraft is on a straight path and otherwise, the direction of their alignment indicates the vertical and lateral curvature of the predicted flight path useful as very clear real time flight path indicators.

A further object of the present invention is to provide a system that is programmed so a new symbol appears at the future position of the aircraft indicating when it will reach a selected critical air speed.

A contributory object of the present invention is to provide a ground path predictor symbology that shows a precise path across the terrain that the aircraft will traverse below the predicted flight path of the aircraft during an upcoming maneuver.

In brief, future position predictions are made by using copies of the flight dynamics model and letting each report a future state of the aircraft's position, altitude, and power. The most appropriate methods of displaying the results to aid the pilot's perceptual, cognitive, and motor tasks are a series of vertically oriented spaced circles diminishing in size from the aircraft, a symbology arrived at after extensive experimentation. Circles can be seen through the aircraft panels and block much less display space than other symbols, and their oval shape when seen at an angle provides a better aspect cue than other symbols. If the circles are all concentric, the aircraft is on a straight path. Otherwise, the direction of their alignment indicates the vertical and lateral curvature of the predicted flight path.

The selection of the diameter of the circles is not as straightforward as it might seem. The problem is that using true perspective results in symbols that are too small to see at a distance or too large to be effective as HMD symbology when close to the aircraft. For this reason, the symbols are scaled to be perceptually effective, rather than realistic, having a maximum and minimum visual subtense. For example, a nearby circle symbol (about 40 feet away) is the equivalent of about 18 inches in diameter (1.9 degrees subtense) in the present system. The circles are scaled to become proportionally smaller in the distance, and at 1000 feet subtend only about 0.5 degree, or one-quarter the subtense of the nearest circles. At this subtense and distance, the circle would actually be 8.4 feet in diameter, but as described, it was more important to scale the symbols for visual effectiveness rather than to meet true perspective.

A preferred embodiment of the symbology provides circles with nominal settings of five symbols spaced 1 second apart for a total of 5 seconds prediction.

Depending upon the angle of view, it is sometimes difficult to determine the shape of the predicted curve of the flight path. In comparing a top view of the symbology with the pilot's normal view, the top view always provided a clear depiction of the shape of the curving flight path. In the pilot's view, the shape was more or less clear depending upon the relative position of the aircraft.

In descending turns, the shape of the predicted path is most evident, especially as it nears the ground. In climbing turns the path shape is reasonably clear, although not as easily interpreted as on a terrain background. In level turns, however, the perspective of the curve is lost and the symbols are simply spread out to the left or right of screen center. The spacing between them is affected either by airspeed or by extent of the turn. Higher airspeeds and tighter turns both increase the distance between symbols.

To make the information from the top view available to the pilot, an additional feature is provided, the Ground Path Predictor, to show the precise path across the terrain that the aircraft will traverse during the upcoming maneuver. The predicted flight path is projected downward from the circles onto the earth, and represented by two red lines at a selected distance apart (approximately one rotor width for helicopters or the wingspan for fixed-wing aircraft). Using the Ground Path Predictor, it is remarkably easy to guide the future flight path over the ground and between or around trees and obstacles without continuous control inputs to correct the path. Once the red lines are aligned with the desired path, no further control inputs need be made.

When the series of circles intersects the path of the Ground Path Predictor, indicating a potential earth impact, a magenta symbol appears, and begins flashing at five seconds to impact.

In experiments the series of circle symbols behaved in a very surprising manner when the pilot executed a quick-stop. The prediction methodology "recognized" that if the rear cyclic position were to be maintained over several seconds, the aircraft would soon be flying backwards. As a result, the symbols were seen to reverse direction and come hurtling back toward the aircraft, obscuring the field of view and creating an alarming image of potential impacts before they assumed their new positions to the rear of the aircraft.

On the other hand, the predicted reversal was useful information because it showed the pilot where the aircraft would slow its forward motion and come to a halt before reversing direction. In order to maintain this information and avoid the bad visual side effects, the symbols are turned off, one-by-one as they began to loop back toward the aircraft, and a new symbol is inserted indicating the location at which the aircraft will reach the selected critical airspeed.

The new symbol appears at the future position of the aircraft when it reaches a selected critical airspeed. For helicopters, fifteen knots is approximately the speed at which effective translational lift is lost, and the rotor begins recirculating old vortexes, substantially reducing lift. This change in performance is important to rotorcraft pilots and is distinctly shown in the present symbology as a wire frame cube approximately the size of the vehicle. This serves both as a useful reference point for intentional slowing, and a warning for those who do not intend to slow so dramatically. For fixed-wing aircraft, the new symbol appears at the location where the aircraft will reach stall speed.

An advantage of the present invention is that it has clear, easily understood symbols.

Another advantage of the present invention is in providing added safety for the pilot and crew.

An additional advantage of the present invention is in preventing the financial loss of an aircraft impact.

One more advantage of the present invention is that the symbology can be used in poor visibility conditions.

Yet another advantage of the present invention is in showing the future positions of an aircraft in the visual field of the pilot superimposed on the landscape.

A further advantage of the present invention is in aiding the pilot's perceptual, cognitive, and motor tasks while operating the aircraft.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
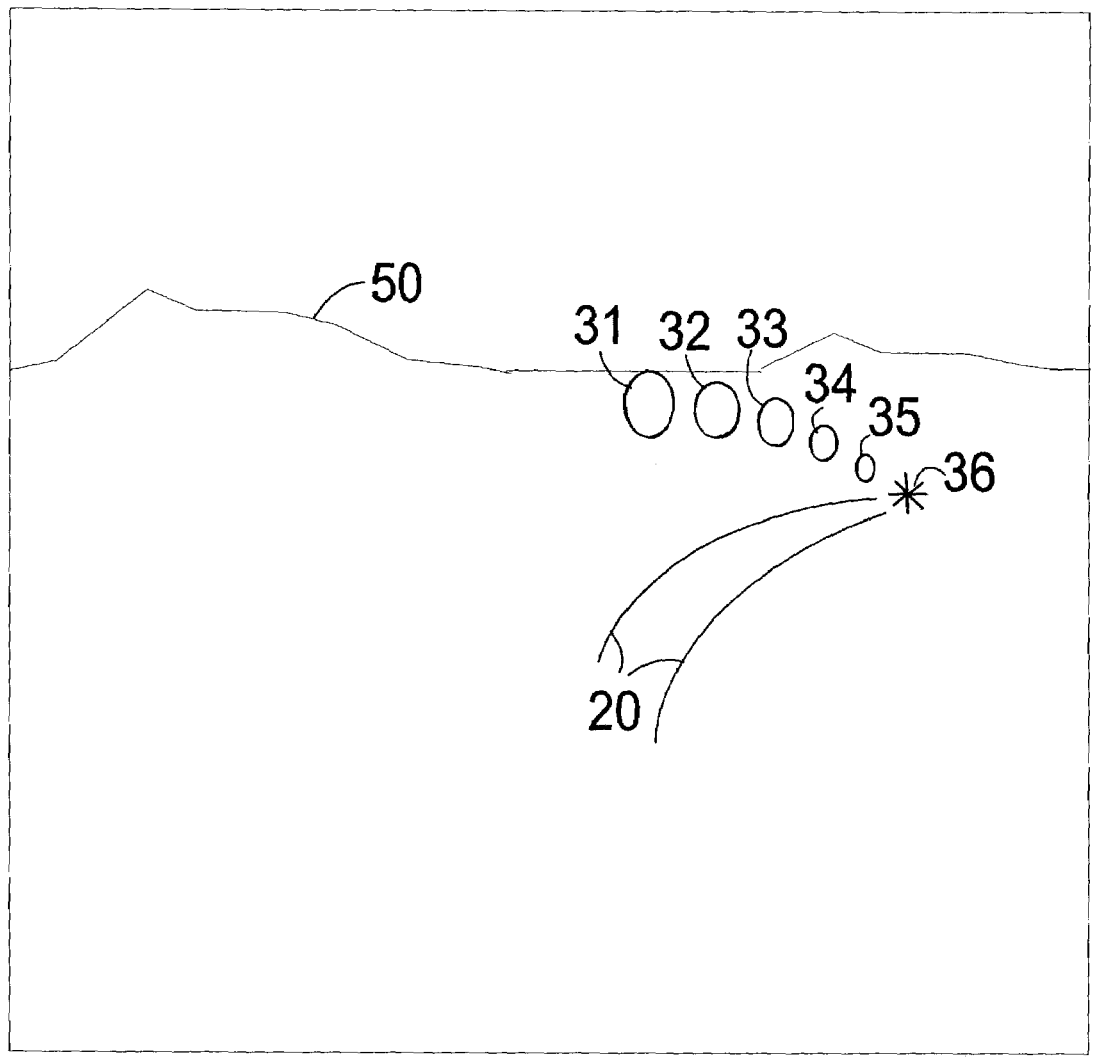
FIG. 1 is a diagram of the pilot's view of the spaced diminishing size circular geometric form of the symbology for predicted flight path and the asterisk or other form of the symbology for predicted ground contact, during flight angling downwardly toward the right.

In FIGS. 1–4, a symbology system is provided for programming information relative to an aircraft's 10 future position and flight path to create a symbology representing the future position 36, and 40 including the flight path 31–35 and ground path 20 of the aircraft 10 in the visual field of a pilot.

The symbology system comprises a programmable means for gathering flight travel information in real time about an aircraft 10 from a number of instruments on the aircraft 10, using the flight travel information to create a symbology representing the aircraft 10 flight path 31–35, ground path 20 and future position information 36, and 40 superimposed on the actual visual field of a pilot of the aircraft 10, shown in FIGS. 1–4.

The symbology for the flight path comprises a series of virtual Figures 31–35 at spaced intervals in front of the aircraft 10 delineating the projected flight path of the aircraft 10 and virtual figures of various shapes and colors with other information about the future predicted position 20, 36 and 40 of the aircraft 10 based on the present real time path of travel of the aircraft 10. The symbology is capable of providing visual real time information to the pilot regarding points of future positions and flight path 31–35 at given time intervals of the aircraft 10 relative to the actual surrounding environment and visual real time information about a predicted future contact 36 of the aircraft 10 with any objects in the environment, including the ground 50, all superimposed on the actual terrain in the visual field of the pilot.

Figure 2:
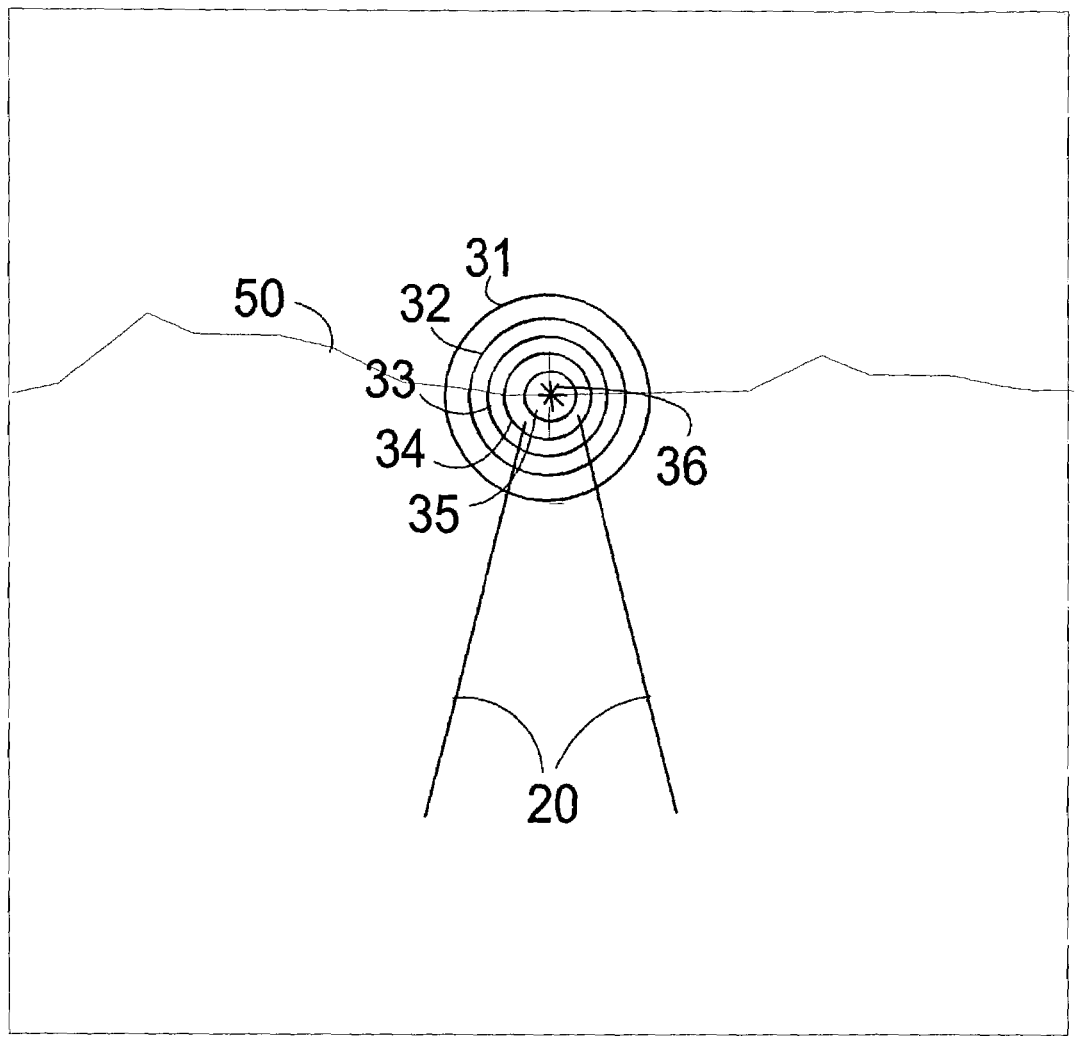
FIG. 2 is a diagram of the pilot's view of the spaced diminishing size circular geometric form of the symbology for predicted flight path and the asterisk or other form of the symbology for predicted ground contact, during straight forward flight, wherein the circles appear in a bullseye configuration.
Figure 3:
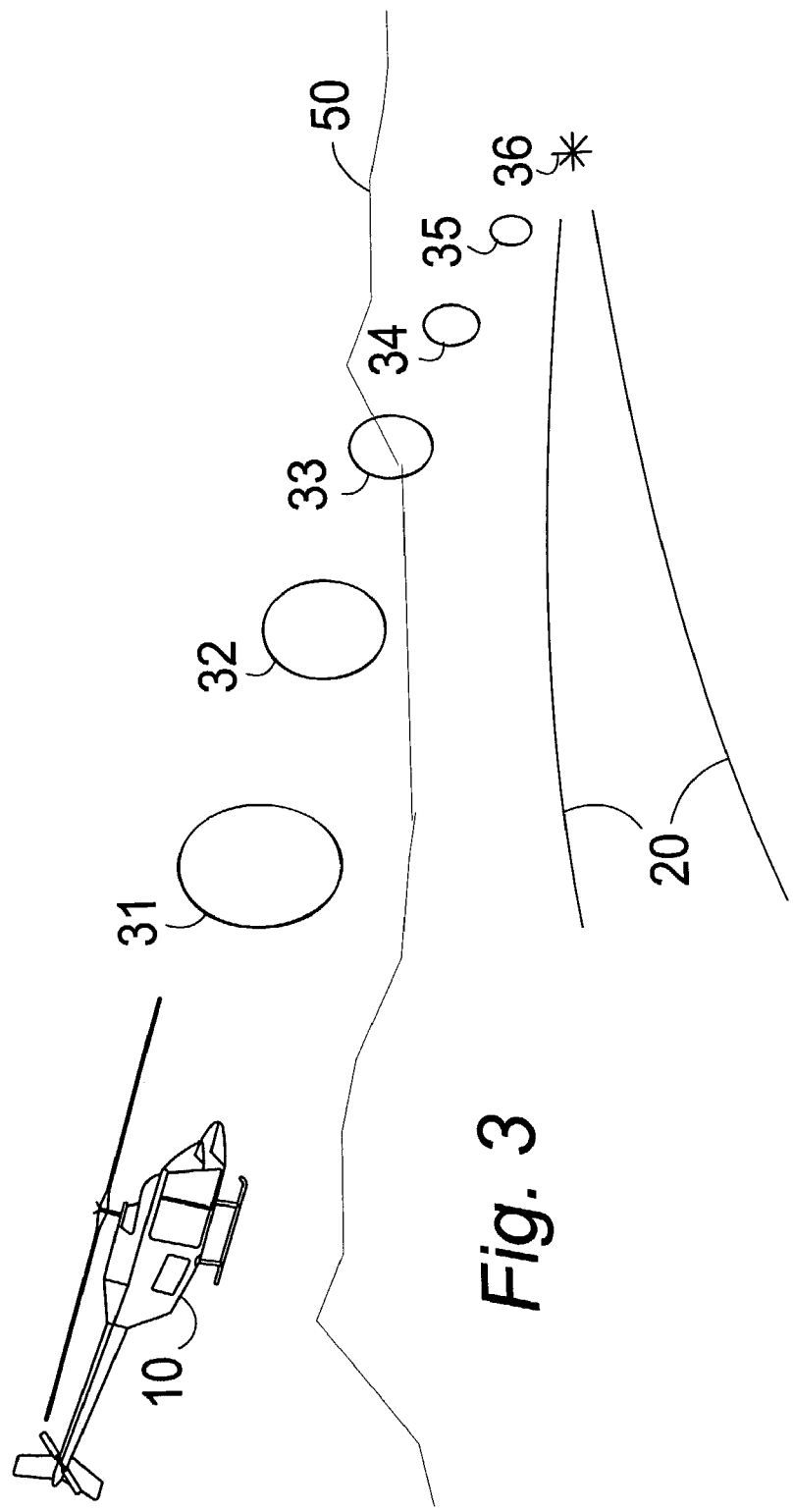
FIG. 3 is a diagram of the external representation of the aircraft flying into the spaced diminishing size virtual circular geometric form of the symbology for predicted flight path and toward the virtual asterisk or other form of the symbology for predicted ground contact.
Figure 4:
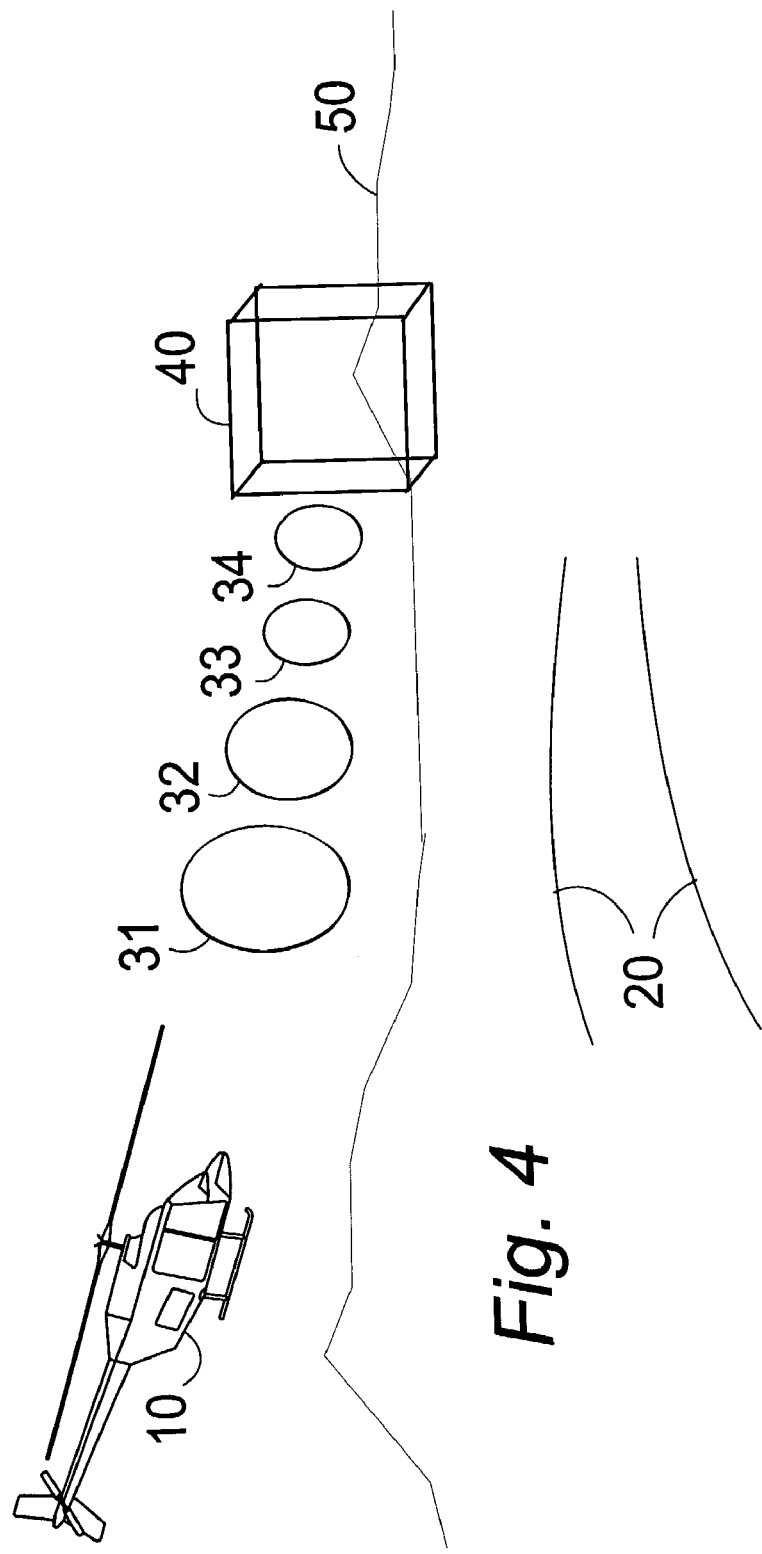
FIG. 4 is a diagram of the external representation of the aircraft flying into the spaced diminishing size virtual circular geometric form of the symbology for predicted flight path and toward the virtual wire box form of the symbology for critically slow flight.

The virtual images of the flight path comprise a series of geometric FIGS. 31–35 at spaced intervals in front of the aircraft 10 through which geometric FIGS. 31–35 the aircraft 10 would travel in the present flight path, passing through each of the series of geometric FIGS. 31–35 in a given time period based on real time flight information, as shown in FIGS. 3 and 4. The geometric FIGS. 31–35 are consecutively smaller as the virtual distance from the aircraft 10 increases so that each subsequent geometric FIGS. 31–35 appears more distant from the aircraft 10 in a simulated perspective view (as shown in FIGS. 1 and 2). The series of geometric FIGS. 31–35 comprise a series of circles vertically oriented and spaced apart by intervals indicating future positions of the aircraft 10 at spaced time and distance intervals. When the aircraft 10 is flown straight ahead, the circles 31–35 align to look like a bulls-eye, as in FIG. 2.

Upon slowing and stopping the aircraft 10, the symbols 31–35 are turned off, one-by-one at the point of the selected critical airspeed, and a new symbol 40 is inserted. The new symbol 40 comprises a wire frame cube (as shown in FIG. 4) to serve both as a useful reference point for the predicted position of the intentional slowing, and a warning for those who do not intend to slow so dramatically. The new symbol 40 appears at the future position of the aircraft 10 when it will reach a selected critical air speed. The virtual images of the symbology system also include a future point of contact 36, shown in FIGS. 1–4, that is designated by a recognizably different imagery and by a different color image from the series of geometric figures representing the predicted flight path 31–35 and ground path 20. The future point of contact 36 is represented by an asterisk or other programmed symbology of a different color, preferably magenta, which flashes on and off at a specified time interval, preferably 5 seconds or more, before predicted impact.

The virtual images of the symbology system also include a predicted ground path 20 that is projected downward from the circles 31–35 onto the earth 50 to show the predicted ground over which the aircraft will travel, and represented preferably by two red lines 20 spaced a specified distance apart, as in FIGS. 1–4.

The symbology system allows the pilot of the aircraft 10 to define dynamically the size, spaced intervals, and color attributes of the symbology 20, 31–35, 36, and 40.

In practice, a computer program takes flight information from the flight instruments on the helicopter 10 and translates it into symbology 20, 31–35, 36, and 40 superimposed onto the view of the terrain in the field of vision of the pilot as seen in FIGS. 1 and 2, appearing to be in front of a helicopter 10, as seen in FIGS. 3 and 4, as the pilot looks through his or her display from the aircraft 10. The symbology 20, 31–35, 36, and 40 of the helicopter 10 is actually superimposed on the landscape 50 that the pilot views as seen in FIGS. 1 and 2.

The pilot of the aircraft 10 would first set the size, spaced intervals, and color attributes of the symbology 20, 31–35, 36, and 40 to meet his or her personal requirements.

To be advised of the future projection of flight, the pilot would observe a series of circles 31–35 that appear to be in front of the helicopter 10 getting smaller in the distance as if the helicopter 10 were going to fly through the circles, as in FIGS. 3 and 4. The circles 31–35 appear in the pilot's view, superimposed on the landscape 50 in the actual view that the pilot has out the front window of the helicopter 10, as in FIGS. 1 and 2. To fly the helicopter 10 straight ahead, the pilot would need to align the circles 31–35 to look like a bulls-eye, as in FIG. 2.

To avoid ground impact a pilot would observe the ground impact symbol (symbology) 36 in FIGS. 1–3. When the helicopter 10 is within 5 seconds (or some other preset time) of hitting the ground 50, the symbol 36 (preferably a magenta asterisk) would start to flash, the pilot would then makes adjustments to the controls of the helicopter 10 to avoid impact or prepare for a landing.

To track the ground path the helicopter 10 would travel, as if the helicopter 10 were flying directly over a road underneath, a pilot would view the symbol or symbology for a ground path 20 (all FIGS.). The ground path symbol 20 is indicated preferably by two spaced-apart red lines, which appear to be projected down onto the earth 50 below the flight path symbology 31–35. When the pilot flies the helicopter 10 straight ahead, as in FIG. 2, they 20 are shown as straight lines getting closer together in the distance as if they were in perspective.

To avoid reaching a selected critical air speed, the pilot would respond to a virtual wire box 40 (in FIG. 4), superimposed in the field of view of the pilot, that shows an approaching critical slowing of the aircraft 10.

It is understood that the preceding description is given merely by way of illustration and not in limitation of the invention and that various modifications may be made thereto without departing from the spirit of the invention as claimed.

What is claimed is:

1. A symbology system for programming information relative to an aircraft's future position and flight path to create a symbology representing the future position and flight path of the aircraft in the visual field of a pilot, the system comprising:
   a programmable means for gathering flight travel information in real time about an aircraft from a number of instruments on the aircraft and using the flight travel information to create a symbology representing the aircraft flight path and future position information in the visual field of a pilot of the aircraft;
   the symbology, superimposed on the actual terrain in the actual visual field of the pilot, comprising a series of virtual figures at spaced intervals in front of the aircraft delineating the projected flight path of the aircraft and the future predicted position of the aircraft based on the present real time path of travel of the aircraft including any future predicted point of contact of the aircraft with any external object including the ground, the symbology providing visual real time information to the pilot regarding points of future positions at given time intervals of the aircraft relative to the actual surrounding environment and visual real time information about a predicted future contact of the aircraft with any objects in the environment including the ground; and
   a virtual representation of the predicted flight path of the aircraft corresponding to a span of a helicopter rotor or a wing span of a plane projected onto the terrain below the projected flight path, the virtual representation of the predicted flight path of the aircraft superimposed on the terrain that the pilot views as a ground path predictor that shows a precise path across the terrain that the aircraft will traverse below the predicted flight path of the aircraft during an upcoming maneuver.

2. The symbology system of claim 1 wherein the series of virtual images comprises a series of geometric figures at spaced intervals in front of the aircraft through which geometric figures the aircraft would travel in the present flight path, passing through each of the series of geometric figures in a given time period based on real time flight information.

3. The symbology system of claim 2 wherein each of the geometric figures in the series of geometric figures is consecutively smaller as the virtual distance from the aircraft increases so that each subsequent geometric figure appears more distant from the aircraft in a simulated perspective view.

4. The symbology system of claim 3 wherein the series of geometric figures comprises a series of circles vertically oriented and spaced apart by intervals indicating future positions of the aircraft at spaced time and distance intervals.

5. The symbology system of claim 4 wherein the predicted flight path is projected downward from the circles onto the earth, and represented by two fed lines spaced apart.

6. The symbology system of claim 2 wherein the predicted future point of contact is designated by a recognizably different imagery from the series of geometric figures representing the predicted flight path.

7. The symbology system of claim 6 wherein the predicted point of contact is designated by a different color image.

8. The symbology system of claim 6 wherein the predicted point of contact is designated by an asterisk or other symbol.

9. The symbology system of claim 6 wherein the predicted point of contact flashes on and off at a specified time interval before predicted impact.

10. The symbology system of claim 1 where the spaced intervals may be defined dynamically by the pilot of the aircraft.

11. The symbology system of claim 1 wherein color attributes of the symbology may be defined dynamically by the pilot of the aircraft.

12. The symbology system of claim 1 where a size of the symbology may be defined dynamically by the pilot of the aircraft.

13. The symbology system of claim 1 wherein upon slowing and stopping the aircraft, the symbols are turned off, one-by-one as they begin to loop back toward the aircraft to indicate a rearward motion of the aircraft, and a new symbol is inserted at the point where the aircraft will reach a selected critical airspeed.

14. A symbology system for programming information relative to an aircraft's future position and flight path to create a symbology representing the future position and flight path of the aircraft in the visual field of a pilot, the system comprising:
   a programmable means for gathering flight travel information in real time about an aircraft from a number of instruments on the aircraft and using the flight travel information to create a symbology representing the aircraft flight path and future position information in the visual field of a pilot of the aircraft;
   the symbology, superimposed on the actual visual field of the pilot, comprising a series of virtual figures at spaced intervals in front of the aircraft delineating the projected flight path of the aircraft and the future predicted position of the aircraft based on the present real time path of travel of the aircraft including any future predicted point of contact of the aircraft with any external object including the ground, the symbology being capable of providing visual real time information to the pilot regarding points of future positions at given time intervals of the aircraft relative to the actual surrounding environment and visual real time information about a predicted future contact of the aircraft with any objects in the environment including the ground;

wherein upon slowing and stopping the aircraft, the symbols are turned off, one-by-one as they begin to loop back toward the aircraft to indicate a rearward motion of the aircraft, and a new symbol is inserted at the point where the aircraft will reach a selected critical airspeed.

15. The symbology system of claim 14 further comprising a ground path predictor symbology to show a precise path across the terrain that the aircraft will traverse below the predicted flight path of the aircraft during an upcoming maneuver.

16. The symbology system of claim 15 wherein the ground path predictor comprises a pair of spaced lines tracking the predicted flight path on the ground below the predicted flight path.

17. The symbology system of claim 14 wherein the system is programmed so that a new symbol appears at the future position of the aircraft when it will reach a selected critical air speed.

18. The symbology system of claim 17 wherein the new symbol comprises a vehicle-sized wire frame cube to serve both as a useful reference point for intentional slowing, and a warning for those who do not intend to slow so dramatically.

* * * * *